Oct. 28, 1924.                J. SMITH                1,513,645
CONTROLLER AND REGULATOR
Filed Sept. 29, 1922
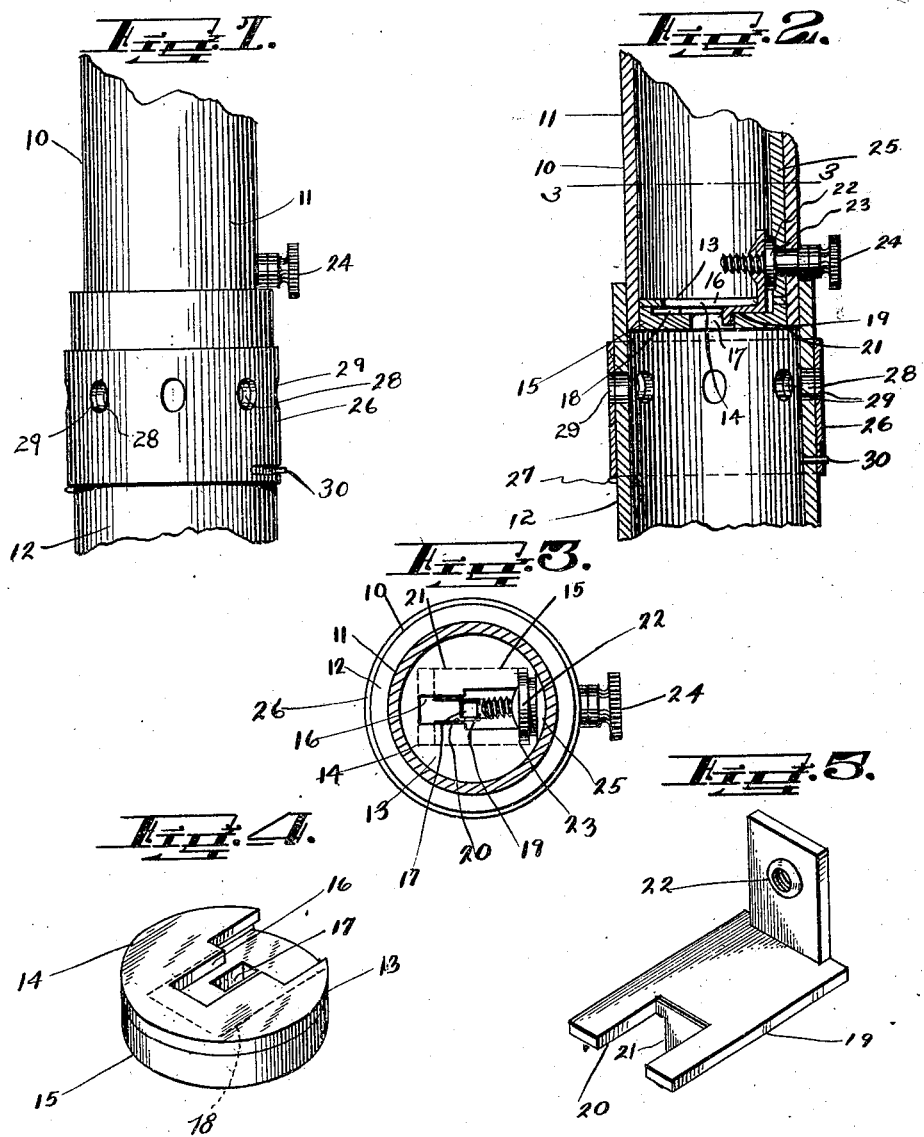
JAMES SMITH,
INVENTOR.
BY Victor J. Evans,
ATTORNEY.
WITNESS: Joseph B. White Patented Oct. 28, 1924.

1,513,645

UNITED STATES PATENT OFFICE.

JAMES SMITH, OF BOSTON, MASSACHUSETTS.

CONTROLLER AND REGULATOR.

Application filed September 29, 1922. Serial No. 591,418.

*To all whom it may concern:*

Be it known that I, JAMES SMITH, a citizen of Russia, Europe, residing at Boston, 4 Acton Street, in the county of Suffolk and State of Massachusetts, have invented new and useful Improvements in Controllers and Regulators, of which the following is a specification.

This invention relates to controllers and regulators.

More particularly the invention relates to devices for controlling and regulating the flows of different fluids such as gas and air and allowing them to commingle.

Some of the objects of the present invention are: to produce a comparatively practical, simple and effectual device of the character mentioned; to employ a conduit having an inlet end and an outlet end, means between the said ends of the conduit for controlling and regulating the flow of a fluid such as gas through the conduit from one end to the other, and means for admitting a fluid such as air into the outlet end of the conduit and for controlling and regulating the flow of air; to produce a gas and air flow controller and regulator especially adapted for use in connection with a flat-iron or the like; and with these and other objects in view the invention resides in the particular provision, construction and relative disposition of parts hereinafter fully described and illustrated in the accompanying drawing, in which:

Figure 1 is a side elevation, a part of the conduit being shown.

Figure 2 is a longitudinal sectional view.

Figure 3 is a transverse sectional view taken on the line 3—3, Figure 1.

Figure 4 is a perspective view of the partition removed from the conduit.

Figure 5 is a perspective view of the slide member of the valve means.

Referring now more particularly to the several views of the drawing, for all of the details of the present invention, it will be apparent that, use of a conduit 10 is made. The conduit 10 is preferably of two parts, a part 11 and a part 12 which is connected to the part 11 in a suitable manner. The conduit 10 as formed has an inlet end which is on the part 11, and the conduit also has an outlet end which is on the part 12. Arranged between the inlet end and the outlet end of the conduit 10 is a partition 13 which in the present instance is held in place in the end of the part 11 which joins the part 12 of the conduit. The partition 13 is preferably of two parts, a part 14 and a part 15 which are held together by pins or any other fastening elements. The partition has a passage therein which is formed by an opening 16 in the part 14, and an opening 17 in the part 15. The part 15 has a recess 18 therein with which portions of the part 14 form a guide-way.

Valve means is provided for controlling and regulating the flow of a fluid such as gas through the partition 13 from the inlet end of the conduit to the outlet end. The valve means essentially includes the guide-way mentioned in which a slide member 19 moves. The slide member 19 is bifurcated as at 20, and it is provided with a lip 21 and a part 22 having a screw threaded bore therein. Movement of the member 19 is effected by a device 23 in the nature of a screw having a manipulator 24. The screw is mounted so that the same may be rotated but it is held against longitudinal movement. The plain part of the screw is disposed in a bore in the wall of the part 11, and in a bore in a plate 25 which broadens the bearing surface and at the same time prevents the leakage of gas. The screw co-acts with the bore in the part 22. By manipulating the manipulator 24 the member 19 may be slid to completely or partly close or open the passage in the partition 13 and in that way the desired amount of gas is allowed to pass from the inlet end of the conduit to the outlet end, or the flow of gas may be cut off completely.

In order that the proper amount of oxygen will be present with the gas to allow combustion, air is admitted to the conduit 10 at the outlet side of the partition. To this end air admission and controlling and regulating means is employed which comprises a member 26 which surrounds the part 12, projections 27 or the like which hold the member 26 in place, apertures 28 and 29 respectively in the part 12 and the member 26, and the pin and slot 30 to limit the movement of the member 26 about the part 12 in opposite directions. The construction and arrangement is such that the apertures 28 and 29 may be made to register partly or completely for the desired quantity of air, or the apertures in the part 12 may be completely covered by portions of the member 26 to prevent the admission of any air. In that way proper combustion of the gas at a flat-iron or the like which may be connected to the outlet end of the conduit may be had.

What is claimed is:

1. A controller and regulator comprising a conduit having an inlet end and an outlet end, a partition having a passage therein in said conduit between its ends, guide ways formed in said partitions, valve means embodied by said partition for controlling and regulating the flow of a fluid through said passage, said valve means including a slide member mounted in said guide ways and capable of traversing said passage to completely or partly close and open the same; an upstanding part formed on said slide and provided with a threaded opening, and a device swivelly mounted in the walls of said conduit for co-action with the threaded opening for moving said slide in either direction.

2. A controller and regulator comprising a conduit having an inlet end and an outlet end, a partition having a passage therein in said conduit between its ends, valve means embodied by said partition and conduit for controlling and regulating the flow of a fluid through said passage, said valve means comprising a slide member capable of traversing said passage to completely or partly close and open the same, and a device swivelly mounted in the walls of said conduit having a manipulator disposed externally of said conduit.

In testimony whereof I have affixed my signature.

JAMES SMITH.